United States Patent
Chen et al.

(10) Patent No.: US 10,366,189 B2
(45) Date of Patent: *Jul. 30, 2019

(54) CONFIGURING A PROGRAMMABLE DEVICE USING HIGH-LEVEL LANGUAGE

(71) Applicant: Altera Corporation, San Jose, CA (US)

(72) Inventors: Doris Tzu-Lang Chen, Toronto (CA); Deshanand Singh, Mississauga (CA)

(73) Assignee: Altera Corporation, San Jose, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/236,949

(22) Filed: Aug. 15, 2016

(65) Prior Publication Data

US 2016/0350452 A1    Dec. 1, 2016

Related U.S. Application Data

(63) Continuation of application No. 14/590,367, filed on Jan. 6, 2015, now Pat. No. 9,449,132, which is a (Continued)

(51) Int. Cl.
*G06F 17/50* (2006.01)
*H03K 19/177* (2006.01)
(Continued)

(52) U.S. Cl.
CPC ........ *G06F 17/505* (2013.01); *G06F 17/5054* (2013.01); *G06F 17/5077* (2013.01);
(Continued)

(58) Field of Classification Search
None
See application file for complete search history.

(56) References Cited

U.S. PATENT DOCUMENTS

| 4,442,504 A | 4/1984 | Dummermuth et al. |
| 5,068,823 A | 11/1991 | Robinson |

(Continued)

FOREIGN PATENT DOCUMENTS

| CN | 1307406 A | 8/2001 |
| CN | 1479892 A | 3/2004 |

(Continued)

OTHER PUBLICATIONS

E. Cartwright et al., "Creating HW/SW Co-Designed MPSoPC's from High Level Programming Models," 2011 IEEE Int'l Conference on High Performance Computing and Simulation (HPCS), Jul. 4-8, 2011, pp. 554-560.*

(Continued)

*Primary Examiner* — Leigh M Garbowski

(57) ABSTRACT

A method of preparing a programmable integrated circuit device for configuration using a high-level language includes compiling a plurality of virtual programmable devices from descriptions in said high-level language. That compiling includes compiling configurations of configurable routing resources from programmable resources of said programmable integrated circuit device, and compiling configurations of a plurality of complex function blocks from programmable resources of said programmable integrated circuit device. A machine-readable data storage medium may be encoded with a library of such compiled configurations. A virtual programmable device may include a stall signal network and routing switches of the virtual programmable device may include stall signal inputs and outputs.

19 Claims, 11 Drawing Sheets

Related U.S. Application Data continuation of application No. 13/369,829, filed on Feb. 9, 2012, now Pat. No. 8,959,469.

(51) Int. Cl.
*H04L 12/24* (2006.01)
*H04L 12/931* (2013.01)

(52) U.S. Cl.
CPC ... *G06F 17/5081* (2013.01); *H03K 19/17736* (2013.01); *H04L 41/0806* (2013.01); *H04L 49/35* (2013.01); *G06F 17/5068* (2013.01); *G06F 2217/66* (2013.01); *G06F 2217/78* (2013.01)

(56) References Cited

U.S. PATENT DOCUMENTS

| | | |
|---|---|---|
| 5,134,884 A | 8/1992 | Anderson |
| 5,142,625 A | 8/1992 | Nakai |
| 5,442,792 A | 8/1995 | Chun |
| 5,469,003 A | 11/1995 | Kean |
| 5,535,342 A | 7/1996 | Taylor |
| 5,535,408 A | 7/1996 | Hillis |
| 5,541,849 A | 7/1996 | Rostoker et al. |
| 5,548,228 A | 8/1996 | Madurawe |
| 5,684,980 A | 11/1997 | Casselman |
| 5,705,938 A | 1/1998 | Kean |
| 5,761,484 A | 6/1998 | Agarwal et al. |
| 5,819,064 A | 10/1998 | Razdan et al. |
| 5,822,570 A | 10/1998 | Lacey |
| 5,835,734 A | 11/1998 | Alkalaj et al. |
| 5,966,534 A | 10/1999 | Cooke et al. |
| 5,968,161 A | 10/1999 | Southgate |
| 5,987,603 A | 11/1999 | Shah |
| 5,999,990 A | 12/1999 | Sharrit et al. |
| 6,044,211 A | 3/2000 | Jain |
| 6,085,317 A | 7/2000 | Smith |
| 6,219,628 B1 | 4/2001 | Kodosky et al. |
| 6,219,785 B1 | 4/2001 | Smith |
| 6,226,776 B1 | 5/2001 | Panchul et al. |
| 6,282,627 B1 | 8/2001 | Wong et al. |
| 6,421,809 B1 | 7/2002 | Wuytack et al. |
| 6,457,173 B1 | 9/2002 | Gupta et al. |
| 6,467,075 B1 | 10/2002 | Sato et al. |
| 6,477,683 B1 | 11/2002 | Killian et al. |
| 6,507,947 B1 | 2/2003 | Schreiber et al. |
| 6,608,638 B1 | 8/2003 | Kodosky et al. |
| 6,625,797 B1 | 9/2003 | Edwards et al. |
| 6,732,341 B1 | 5/2004 | Chang et al. |
| 6,745,160 B1 | 6/2004 | Ashar et al. |
| 6,779,169 B1 | 8/2004 | Singh et al. |
| 7,181,717 B1 | 2/2007 | Singh et al. |
| 7,219,342 B2 | 5/2007 | Metzgen |
| 7,254,801 B1 | 8/2007 | Borer |
| 7,290,240 B1 | 10/2007 | Lam-Leventis et al. |
| 7,555,741 B1 | 6/2009 | Milton et al. |
| 8,296,696 B1 | 10/2012 | Chiu et al. |
| 8,510,688 B1 | 8/2013 | Singh et al. |
| 8,959,469 B2 | 2/2015 | Chen et al. |
| 9,449,132 B2 | 9/2016 | Chen et al. |
| 9,495,139 B2* | 11/2016 | Stitt ................. G06F 8/4441 |
| 2002/0124238 A1 | 9/2002 | Metzgen |
| 2005/0283743 A1 | 12/2005 | Mulholland et al. |
| 2006/0185423 A1 | 8/2006 | McLain et al. |
| 2007/0169033 A1 | 7/2007 | Metzgen |
| 2008/0178130 A1 | 7/2008 | He |
| 2013/0212365 A1 | 8/2013 | Chen et al. |
| 2013/0212366 A1 | 8/2013 | Chen et al. |

FOREIGN PATENT DOCUMENTS

| | | |
|---|---|---|
| CN | 1591377 A | 3/2005 |
| CN | 1851824 A | 10/2006 |
| EP | 0 419 105 A2 | 3/1991 |
| EP | 0 445 913 A2 | 9/1991 |
| EP | 0 759 662 A2 | 2/1997 |
| EP | 0 801 351 | 10/1997 |
| EP | 0 829 812 | 3/1998 |
| EP | 1 742 159 | 1/2007 |
| GB | 1 444 084 | 7/1976 |
| JP | 2006171913 A | 6/2006 |
| JP | 2007109101 A | 4/2007 |
| JP | 2008181170 A | 8/2008 |
| WO | WO94/10627 | 5/1994 |
| WO | WO97/09930 | 3/1997 |
| WO | WO97/13209 | 4/1997 |
| WO | WO00/38087 | 6/2000 |
| WO | WO02/13004 | 2/2002 |

OTHER PUBLICATIONS

I. Lebedev et al., "MARC: A Many-Core Approach to Reconfigurable Computing," 2010 IEEE Int'l Conference on Reconfigurable Computing, pp. 7-12.*
M. Lin et al., "OpenRCL: Low-Power High-Performance Computing with Reconfigurable Devices," 2010 IEEE Int'l Conference on Field Programmable Logic and Applications, pp. 458-463.*
A. Papakonstantinou et al., "FCUDA: Enabling Efficient Compilation of CUDA Kernels into FPGAs," 2009 IEEE $7^{th}$ Symposium on Application Specific Processors (SASP), pp. 35-42.*
Chinese Search Report dated Dec. 16, 2016.
European Search Report and Opinion dated Sep. 17, 2013.
Camposano, et al.; "VHDL as Input for High-Level Synthesis"; IEEE Design & Test of Computers; New York, NY; vol. 8, No. 1; Mar. 1991 pp. 43-49.
Lis, et al.; "Synthesis from VHDL", VLSI in Computers & Processors; IEEE International Conference on Computer Design; Rye Brook, NY; Oct. 1988; pp. 378-381.
U.S. Appl. No. 13/369,839, filed Feb. 9, 2012, in Re Application Chen, et al.
CN 1851824A English Translation of Abstract.
CN 1307406A English Translation of Abstract.
CN 1479892A English Translation of Abstract.
JP Laid-Open Pub. No. 2008-219806 and the English translation of the abstract.
Zubin Shen; "FPGA/CPLD Based Digital System Design Optimization"; Journal of Jianghan University (Natural Sciences), vol. 34, No. 1, Mar. 2006; and the English translation of the abstract.
Callahan, T. J., et al., "The Garp Architecture and C Compiler," Computer, Apr. 2000, pp. 62-69.
Cardoso, J., et al., "Macro-Based Hardware Compilation of Java™ Bytecodes into a Dynamic Reconfigurable Computing System," Proceedings of Seventh Annual IEEE Symposium, Apr. 21, 1999, Los Alamitos, CA, pp. 2-11.
Coole, J., et al., "Intermediate Fabrics: Virtual Architecture for Circuit Portability and Fast Placement and Routing," IEEE/ACM/IFIP International Conference on Hardware/Software Codesign and System Synthesis (CODES+ISSS), pp. 13-22 (Oct. 29, 2010).
Edwards, M.D., et al., "Software acceleration using proammable hardware devices," IEE Proc. Comput. Digit. Tech., vol. 143, No. 1, Jan. 1996, pp. 55-63.
Guccione, S., List of FPGA-based Computing Machines,<http:--www.io.com--guccione-HW_list.html>, Last Modified Mar. 31, 1999, pp. 1-60.
IBM, "Programmable Manual Cable Assembly Board," May 1989, IBM Technical Disclosure Bulletin, vol. 31, No. 12, pp. 306-309.
Iseli, C., et al., "A C++ compiler for FPGA custom execution synthesis," Proceedings of IEEE Symposium, Apr. 19, 1995, Los Alamitos, CA, pp. 173-179.
Isshiki, T., et al., "Bit-Serial Pipeline Synthesis and Layout for Large-Scale Configurable Systems," Proceedings of the ASP-DAC '97, Jan. 28, 1997, Chiba, Japan, pp. 441-446.
Jacobson, H.M. et al., "Synchronous Interlocked Pipelines," The Eighth IEEE International Symposium on Asynchronous Circuits and Systems (ASYNC'02), Apr. 8-11, 2002.

(56) References Cited

OTHER PUBLICATIONS

Kastrup, Bernardo., et al., "ConCISe: A Compiler-Driven CPLD-Based instruction Set Accelerator," Proceedings of Seventh Annual IEEE Symposium, Apr. 21, 1999, Los Alamitos, CA, pp. 92-101.
Kountourisa., et al,, "High Level Pre-Synthesis Optimization Steps Using Hierarchical Conditional Dependency Graphs," Euromicro Conference, 1999, Proceedings, 25th, Milan, Italy, Sep. 8-10, 1999, Los Alamitos, CA, USA.
"Motorola-Prozessor: Mit programmierbarer Logik verheiratet," Electronik, DE, Franzis Verlag GmbH, Mar. 31, 1998, vol. 47, No, 7, p. 38, No Translation.
Nanya, T., "Asynchronous VLSI System Design," ASP-DAC '98 Tutorials, Feb. 10, 1998, Yokohama, Japan, 21 pages.
Nanya, T., et al., "Scalable-Delay-Insensitive Design: A high-performance approach to dependable asynchronous systems," Proceedings of International Symposium on Future ofi intellectual integrated Electronics, Mar. 1999, pp. 531-540.
Owaida, M., et al., "Synthesis of Platform Architectures from OpenCL Programs," IEEE International Symposium on Field-Programmable Custom Computing Machines (FCCM), pp. 186-193 (May 2, 2011).
Page, I., "Constructing Hardware-Software Systems from a Single Description," Journal of VSLI Signal Processing, vol. 12, No. 1, Jan. 1996, pp. 87-107.
Peterson, J.B., et al., "Scheduling and Partitioning ANSI-C Programs onto Multi-FPGA CCM Architectures," FPGAS for Custom Computing Machines, Apr. 1996, pp. 178-187.
Semeria, L., et al., "SpC: Synthesis of Pointers in C Application of Pointer Analysis, to the Behavioral Synthesis from C," Proceedings of ICCAD International Conference on Computer Aided Design, Nov. 8-12, 1998, San Jose, CA, pp. 340-346.
Singh, D., "Higher Level Programming Abstractions for FPGSs using Open CL," FPGA 2011 Pre-Conference Workshop: The Role of FPGAS in a Converged Future with Heterogeneous Programmable Processors, pp. 1-22 (Feb. 27, 2011).
Stitt, G., et al., "An End-to-End Tool Flow for FPGA-Accelerated Scientific Computing," IEEE Design & Test of Computers, vol. 28, No. 4, pp. 68-77 (Jul. 1, 2011).
Stitt, G., et al., "Intermediate Fabrics: Virtual Architectures for Near-Instant FPGA Compilation," IEEE Embedded Systems Letters, vol. 3, No. 3, pp. 81-84 (Sep. 1, 2011).
Wazlowski, M., et al., "PRISM-II Compiler and Architecture," Proceedings of IEEE Workshop, Apr. 5, 1994, Los Alamitos, CA, pp. 9-16.
Wirthlin, M. J., et al., "Improving Functional Density Using Run-Time Circuit Reconfiguration," IEEE Transactions on Very Large Scale Integration (VSLI) Systems, vol. 6, No. 2, Jun. 1998, pp. 247-256.
Wo, D., et al., "Compiling to the gate Level for a Reconfigurable Co-Processor," Proceedings of IEEE Workshop, Apr. 10, 1994, Los Alamitos, CA, pp. 147-154.
Yamauchi et al., "SOP: Adaptive Massively Parallel System", NEC Research and Development, Nippon Electric Ltd., Tokyo, JP, vol. 37 No. 3, Jul. 1996, pp. 382-393.
Yamauchi, T., et al. "SOP: A Reconfigurable Massively Parallel System and Its Control-Data-Flow based Compiling Method," NEC Laboratory, IEEE 1996, pp. 148-156.
U.S. Appl. No. 14/590,367, filed Jan. 6, 2015, in Re Application Doris Tzu-Lang Chen, et al.
Yuan Chou, et al., "PipeRench Implementation of the Instruction Path Coprocessor" Department of Electrical and Computer Engineering Carnegie Mellon University Pittsburgh, PA 15213, 2000 IEEE, 12 pages.
Advisory Action for U.S. Appl. No. 13/369,836, dated May 12, 2015, 3 pages.
Advisory Action for U.S. Appl. No. 13/369,829, dated May 28, 2013, 3 pages.
Chinese and English Translation of P.R. China State Intellectual Property Office First Office Action for Patent Application No. 201310065374.7, dated Dec. 26, 2016, 16 pages.
Chinese and English Translation of P.R. China State Intellectual Property Office First Office Action for Patent Application No. 201310064875.3, dated Oct. 9, 2016, 26 pages.
Chinese and English Translation of P.R. China State Intellectual Property Office First Office Action for Patent Application No. 201310064875.3, dated Jan. 31, 2018, 30 pages.
European First Office Action for Patent Application No. 13154771.3, dated Sep. 29, 2016, 7 pages.
European First Office Action for Patent Application No. 13154773.9, dated Feb. 17, 2017, 8 pages.
European Summons to Attend Oral Proceedings for Patent Application No. 13154773.9, dated Nov. 26, 2018, 10 pages.
Extended European Search Report for Patent Application No. 13154771.3, dated May 31, 2013, 6 pages.
Final Office Action for U.S. Appl. No. 13/369,829, dated Apr. 29, 2013, 8 pages.
Final Office Action for U.S. Appl. No. 13/369,836, dated Feb. 4, 2015, 16 pages.
Final Office Action for U.S. Appl. No. 13/369,836, dated Sep. 7, 2018, 30 pages.
First Office Action for U.S. Appl. No. 13/369,829, dated Dec. 7, 2012, 7 pages.
First Office Action for U.S. Appl. No. 14/590,367, dated Jan. 21, 2016, 6 pages.
Goldstein, Seth Copen; PipeRench: A Reconfigurable Architecture and Compiler; IEEE 2000, pp. 1-8.
Japanese and English Translation of Japanese First Office Action for Patent Application No. 2013-022166, dated Jun. 16, 2016, 7 pages.
Japanese and English Translation of Japanese First Office Action for Patent Application No. 2013-022168, dated Feb. 14, 2017, 18 pages.
Japanese and English Translation of Japanese First Office Action for Patent Application No. 2017-182139, dated Aug. 9, 2018, 12 pages.
Muhsen Owaida et al., Massively Parallel Programming Models Used as Hardware Description Languages: The OpenCL Case; IEEE 2011, pp. 326-333.
Office Action for U.S. Appl. No. 13/369,836, dated Jun. 30, 2015, 24 pages.
Office Action for U.S. Appl. No. 13/369,836, dated Sep. 16, 2014, 12 pages.
Office Action for U.S. Appl. No. 13/369,836, dated Sep. 29, 2017, 32 pages.

* cited by examiner

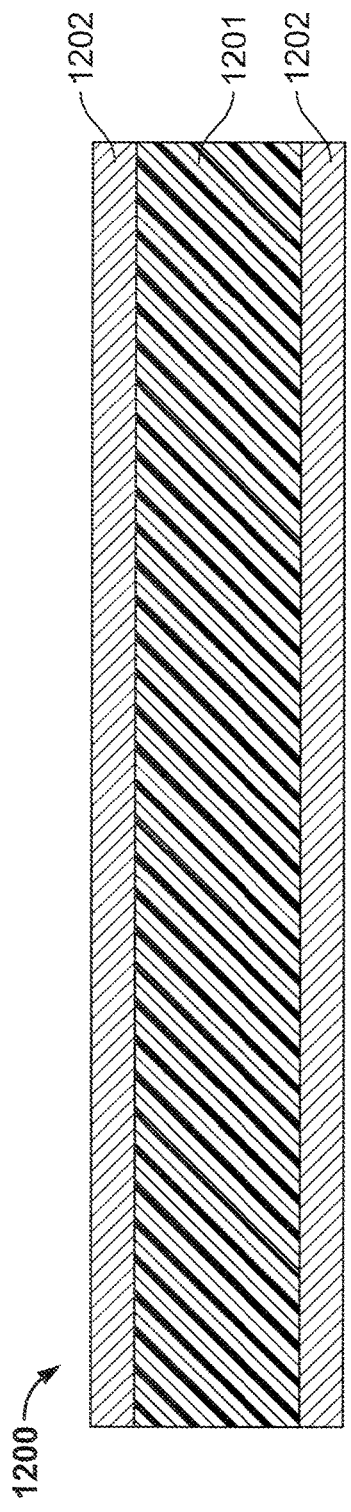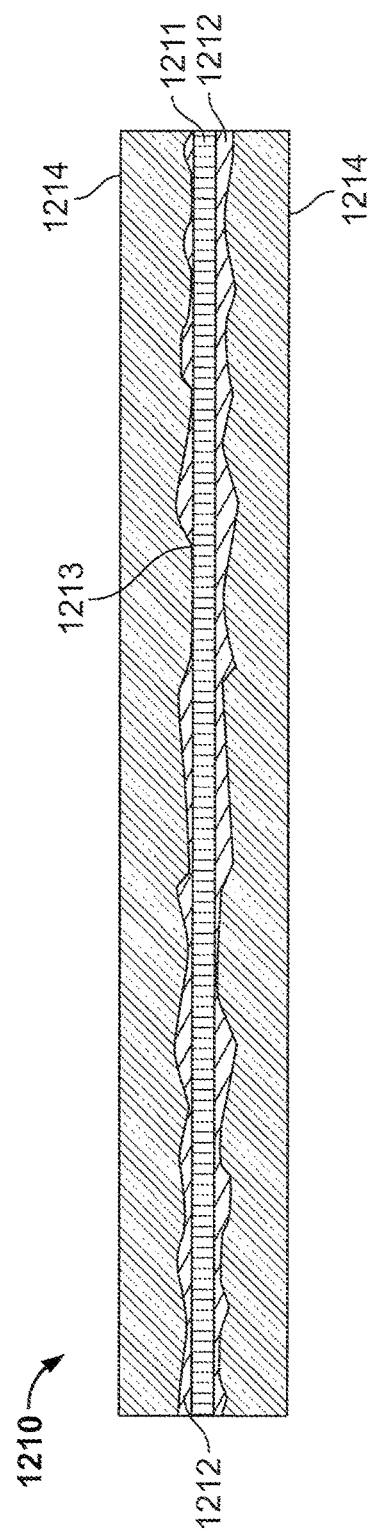

CONFIGURING A PROGRAMMABLE DEVICE USING HIGH-LEVEL LANGUAGE

CROSS REFERENCE TO RELATED APPLICATIONS:

This application is a continuation of and claims priority and benefit to U.S. application Ser. No. 14/590,367 filed on Jan. 6, 2015, entitled, "Configuring a Programmable Device Using High-Level Language", which is a continuation of and claims priority and benefit to U.S. Pat. No. 8,959,469 filed on Feb. 9, 2012, entitled, "Configuring a Programmable Device Using High-Level Language".

FIELD OF THE INVENTION

This invention relates to the use of a high-level language to configure a programmable integrated circuit devices such as a field-programmable gate array (FPGAs) or other type of programmable logic devices (PLDs).

BACKGROUND OF THE INVENTION

Early programmable devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

At some point, such devices began to be provided with embedded blocks of random access memory that could be configured by the user to act as random access memory, read-only memory, or logic (such as P-TERM logic). Moreover, as programmable devices have become larger, it has become more common to add dedicated circuits on the programmable devices for various commonly-used functions. Such dedicated circuits could include phase-locked loops or delay-locked loops for clock generation, as well as various circuits for various mathematical operations such as addition or multiplication. This spares users from having to create equivalent circuits by configuring the available general-purpose programmable logic.

While it may have been possible to configure the earliest programmable logic devices manually, simply by determining mentally where various elements should be laid out, it was common even in connection with such earlier devices to provide programming software that allowed a user to lay out logic as desired and then translate that logic into a configuration for the programmable device. With current larger devices, including those with the aforementioned dedicated circuitry, it would be impractical to attempt to lay out the logic without such software. Such software also now commonly includes pre-defined functions, commonly referred to as "cores," for configuring certain commonly-used structures, and particularly for configuring circuits for mathematical operations incorporating; the aforementioned dedicated circuits. For example, cores may be provided for various trigonometric or algebraic functions.

Although available programming software allows users to implement almost any desired logic design within the capabilities of the device being programmed, most such software requires knowledge of hardware description languages such as VHDL or Verilog. However, many potential users of programmable devices are not well-versed in hardware description languages and may prefer to program devices using a higher-level programming language.

SUMMARY OF THE INVENTION

One high-level programming language that may be adopted for configuring a programmable device is OpenCL (Open Computing Language), although use of other high-level languages, and particularly other high-level synthesis languages, including C, C++, Fortran, C#, F#, BlueSpec and Matlab, also is within the scope of this invention.

In OpenCL, computation is performed using a combination of a host and kernels, where the host is responsible for input/output (I/O) and setup tasks, and kernels perform computation on independent inputs. Where there is explicit declaration of a kernel, and each set of elements to be processed is known to be independent, each kernel can be implemented as a high-performance hardware circuit. Based on the amount of space available on a programmable device such as an FPGA, the kernel may be replicated to improve performance of an application.

A kernel compiler converts a kernel into a hardware circuit, implementing an application from an OpenCL description, through hardware generation, system integration, and interfacing with a host computer. The compiler may be based on an open-source Low-Level Virtual Machine compiler extended to enable compilation of OpenCL applications. The compiler parses, analyzes, optimizes and implements an OpenCL kernel as a high-performance pipelined circuit, suitable for implementation on programmable device such as an FPGA. The system may then be compiled using programming tools appropriate for the particular programmable device. The device also has an embedded hard processor or may be configured with an embedded soft processor, to run the OpenCL (or other high-level) code, or an external processor may be used. The OpenCL or other high-level code can be run by executing the host program on the embedded or external processor.

In accordance with the present invention there is provided a method of preparing a programmable integrated circuit device for configuration using a high-level language. The method includes compiling a plurality of virtual programmable devices from descriptions in said high-level language. That compiling includes compiling configurations of configurable routing resources from programmable resources of said programmable integrated circuit device, and compiling configurations of a plurality of complex function blocks from programmable resources of said programmable integrated circuit device.

A machine-readable data storage medium encoded with a library of such compiled configurations also is provided, as is a routing switch that may be used in a virtual programmable device or any programmable device.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 10 is a cross-sectional view of a magnetic data storage medium encoded with a set of machine-executable instructions for performing the method according to the present invention;

FIG. 11 is a cross-sectional view of an optically readable data storage medium encoded with a set of machine executable instructions for performing the method according to the present invention.

DETAILED DESCRIPTION OF THE INVENTION

In OpenCL, an application is executed in two parts—a host and a kernel. The host is a program responsible for processing I/O requests and setting up data for parallel processing. When the host is ready to process data, it can launch a set of threads on a kernel, which represents a unit of computation to be performed by each thread.

Each thread executes a kernel computation by loading data from memory as specified by the host, processing those data, and then storing the results back in memory to be read by the user, or by the user's application. In OpenCL terminology, a kernel and the data on which it is executing are considered a thread. Results may be computed for a group of threads at one time. Threads may be grouped into workgroups, which allow data to be shared between the threads in a workgroup. Normally, no constraints are placed on the order of execution of threads in a workgroup.

For the purposes of data storage and processing, each kernel may have access to more than one type of memory— e.g., global memory shared by all threads, local memory shared by threads in the same workgroup, and private memory used only by a single thread.

Execution of an OpenCL application may occur partially in the host program and partially by executing one or more kernels. For example, in vector addition, the data arrays representing the vectors may be set up using the host program, while the actual addition may be performed using one or more kernels. The communication between these two parts of the application may facilitated by a set of OpenCL functions in the host program. These functions define an interface between the host and the kernel, allowing the host program to control what data is processed and when that processing begins, and to detect when the processing has been completed.

A programmable device such as an FPGA may be programmed using a high-level language such as OpenCL by starting with a set of kernels and a host program. The kernels are compiled into hardware circuit representations using a Low-Level Virtual Machine (LLVM) compiler that may be extended for this purpose. The compilation process begins with a high-level parser, such as a C-language parser, which produces an intermediate representation for each kernel. The intermediate representation may be in the form of instructions and dependencies between them. This representation may then be optimized to a target programmable device.

Figure 5:
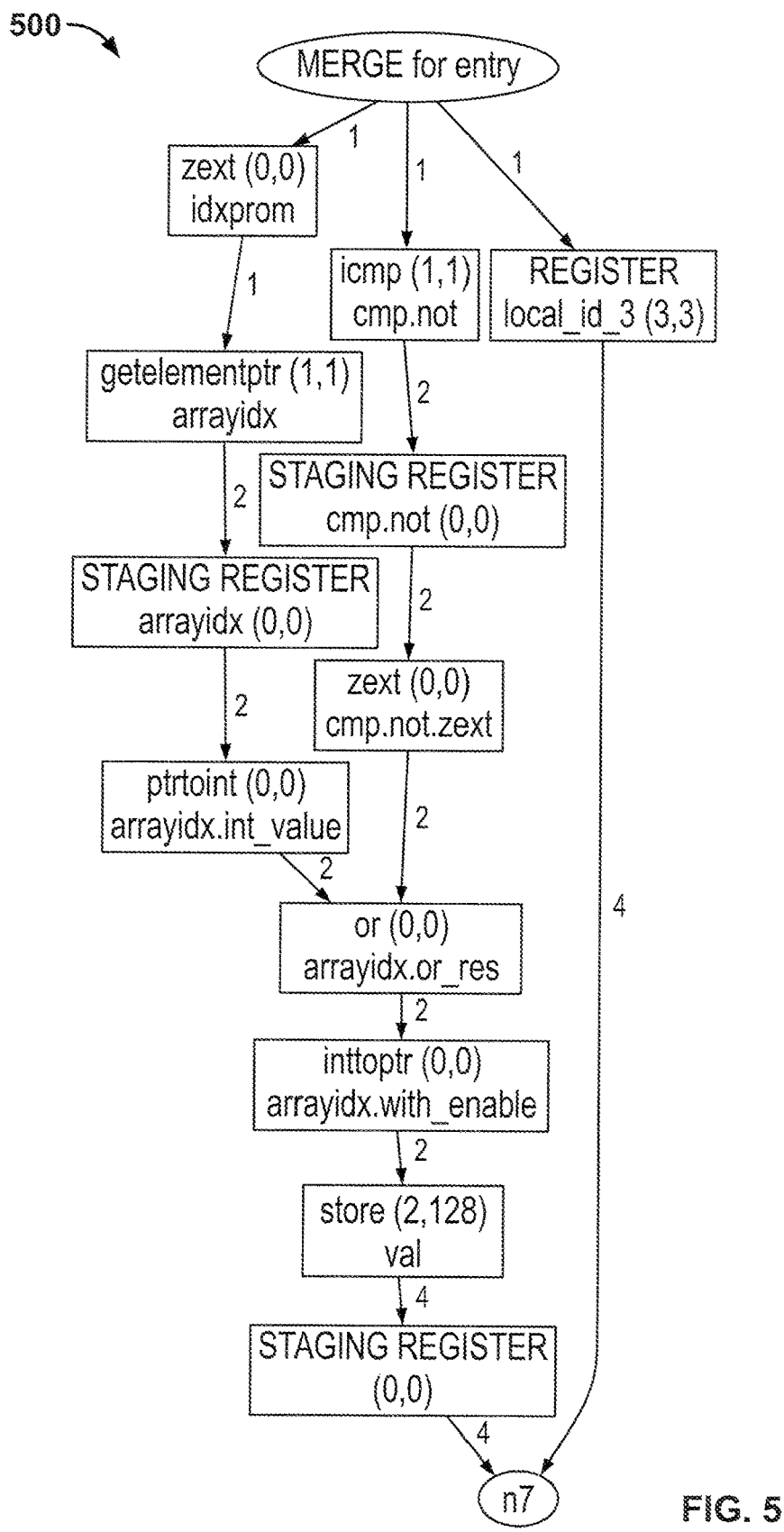
FIG. 5 shows an example of a virtual fabric in accordance with embodiments of the invention including soft microprocessor blocks.

An optimized LLVM intermediate representation is then converted into a hardware-oriented data structure, such as a Control-Data Flow Graph (CDFG) (FIG. 5). This data structure represents the kernel at a low level, and contains information about its area and maximum clock frequency. The CDFG can then be optimized to improve area and performance of the system, prior to RTL generation which produces a Verilog HDL description of each kernel.

The compiled kernels are then instantiated in a system that preferably contains an interface to the host as well as a memory interface. The host interface allows the host program to access each kernel. This permits setting workspace parameters and kernel arguments remotely. The memory serves as global memory space for an OpenCL kernel. This memory can be accessed via the host interface, allowing the host program to set data for kernels to process and retrieve computation results. Finally, the host program may be compiled using a regular compiler for the high-level language in which it is written (e.g., C++).

Returning to individual parts of the process, to compile kernels into a hardware circuit, each kernel is implemented from basic block modules. Each basic block module comprises an input and an output interface with which it talks to other basic blocks, and implements an instruction such as load, add, subtract, store, etc.

The next step in implementing each kernel as a hardware circuit is to convert each basic block module into a hardware module. Each basic block module is responsible for handling the operations inside of it. To function properly, a basic block module also should to be able to exchange information with other basic blocks. Determining what data each basic block requires and produces may be accomplished using Live-Variable Analysis.

Once each basic block is analyzed, a Control-Data Flow Graph (CDFG) (FIG. 5) can be created to represent the operation of that basic block module, showing how that basic block module takes inputs either from kernel arguments or another basic block, based on the results of the Live-Variable Analysis. Each basic block, once instantiated, processes the data according to the instructions contained within the block and produces output that can be read by other basic blocks, or directly by a user.

Once each basic block module has be represented as a. CDFG, operations inside the block can be scheduled. Each node may be allocated a set of registers and clock cycles that it requires to complete an operation. For example, an AND operation may require no registers, but a floating-point addition may require at least seven clock cycles and corresponding registers. Once each basic block is scheduled, pipelining registers may be inserted to balance the latency of each path through the CDFG. This allows many threads to be processed.

Once each kernel has been described as a hardware circuit, a design may be created including the kernels as well as memories and an interface to the host platform. To prevent pipeline overload, the number of threads allowed in a workgroup, and the number of workgroups allowed simultaneously in a kernel, may be limited.

Figure 1:
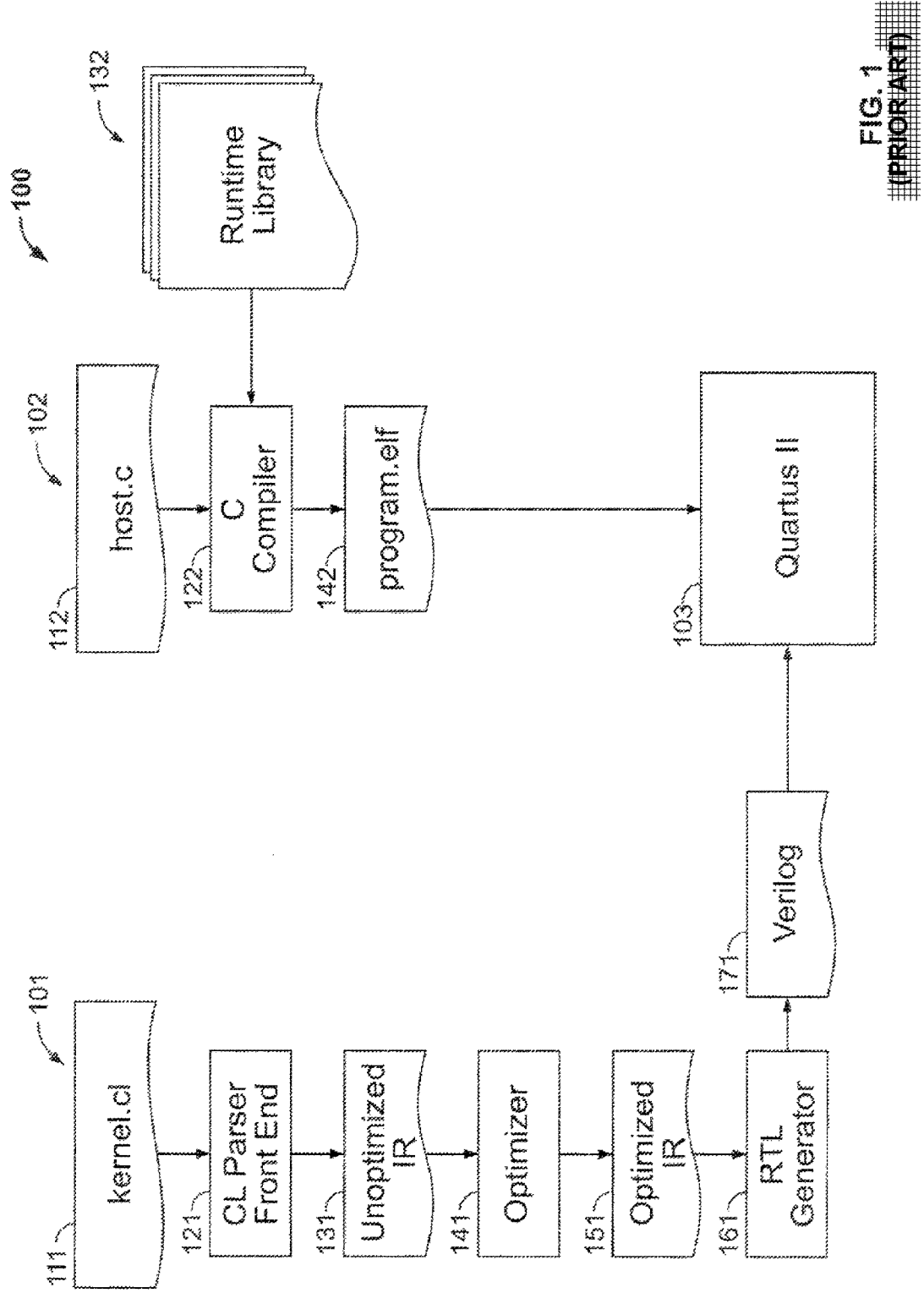
FIG. 1 shows a known method for using a high-level language to configure a programmable device.

The foregoing generalized method 100 is diagrammed in FIG. 1 where path 101 shows the implementation of a kernel while path 102 shows the implementation of a host program.

Path 101 starts with a kernel file (kernel.cl) 111. Parser front end 121 derives unoptimized intermediate representation 131 from kernel file 111, which is converted by optimizer 141 to an optimized intermediate representation 151. The optimization process includes compiler techniques to make the code more efficient, such as, e.g., loop unrolling, memory-to-register conversion, dead code elimination, etc. A Register Timing Language (RTL) 161 generator converts optimized intermediate representation 151 into a hardware description language representation 171, which may be written in any hardware description language such as Verilog (shown) or VHDL.

Path 102 starts with a host program file (host.c) 112 which is compiled by a compiler 122 using runtime library 132, which includes software routines that abstract the communication between the host and the programmable device, to create an executable program file 142.

Executable program file 142 and hardware description language representation(s) 171 of the kernel(s) are compiled into a programmable device configuration by appropriate software 103. For example, for FPGA devices available from Altera Corporation, of San Jose, Calif., software 103 might be the QUARTUS® II software provided by Altera.

The result is a programmable device configured to run a host program on kernel files to instantiate circuits represented by the kernels. The programmable device should have an embedded processor to execute program file 142 to execute kernel(s) 111 to generate hardware description language representation(s) 161. If the embedded processor is a "soft" processor, it also may be configured using software 103. If the embedded processor is a "hard" processor, software 103 configures the appropriate connections to the hard processor.

Although the foregoing generalized method can be used to create efficient hardware circuit implementations of user logic designs using a high-level language, such as OpenCL, the required compile time can compare unfavorably to that required for convention hardware-description-language-based programming. Depending on the particular user logic design, compilation may take hours or even days, as compared to seconds or minutes for HDL-based programming. The problem of long compile times may be magnified by the need to periodically change a logic design, particularly during development.

Figure 2:
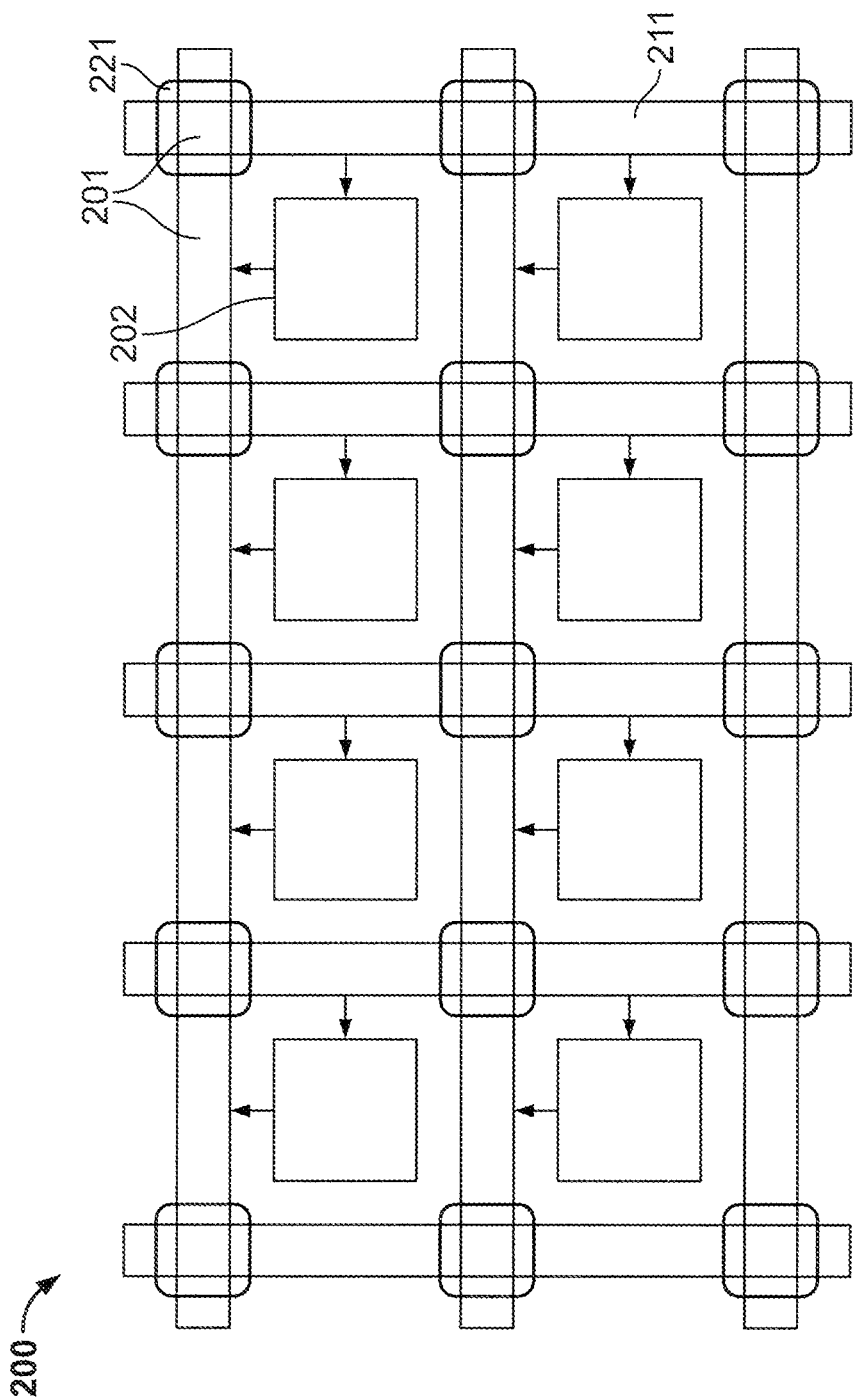
FIG. 2 shows a control-data flow graph used in methods including methods according to embodiments of the invention.

Therefore, in accordance with the present invention, a plurality of high-level language representations of "virtual fabrics" may be precompiled. Each such virtual fabric 200 (FIG. 2) may be a high-level language representation of a coarse-grained virtual FPGA including an interconnect network 201 of buses 211 and routing switches 221, and a relatively smaller number of more complex function blocks 202 representing combinations of logic elements, implemented on top of a physical FPGA having a relatively larger number of individual logic elements. For example, function blocks 202 may include blocks for performing basic mathematical functions such as fixed- or floating-point additions or multiplications, or trigonometric functions, as well as multiplexing logic or even "soft" microprocessors.

Figure 3:
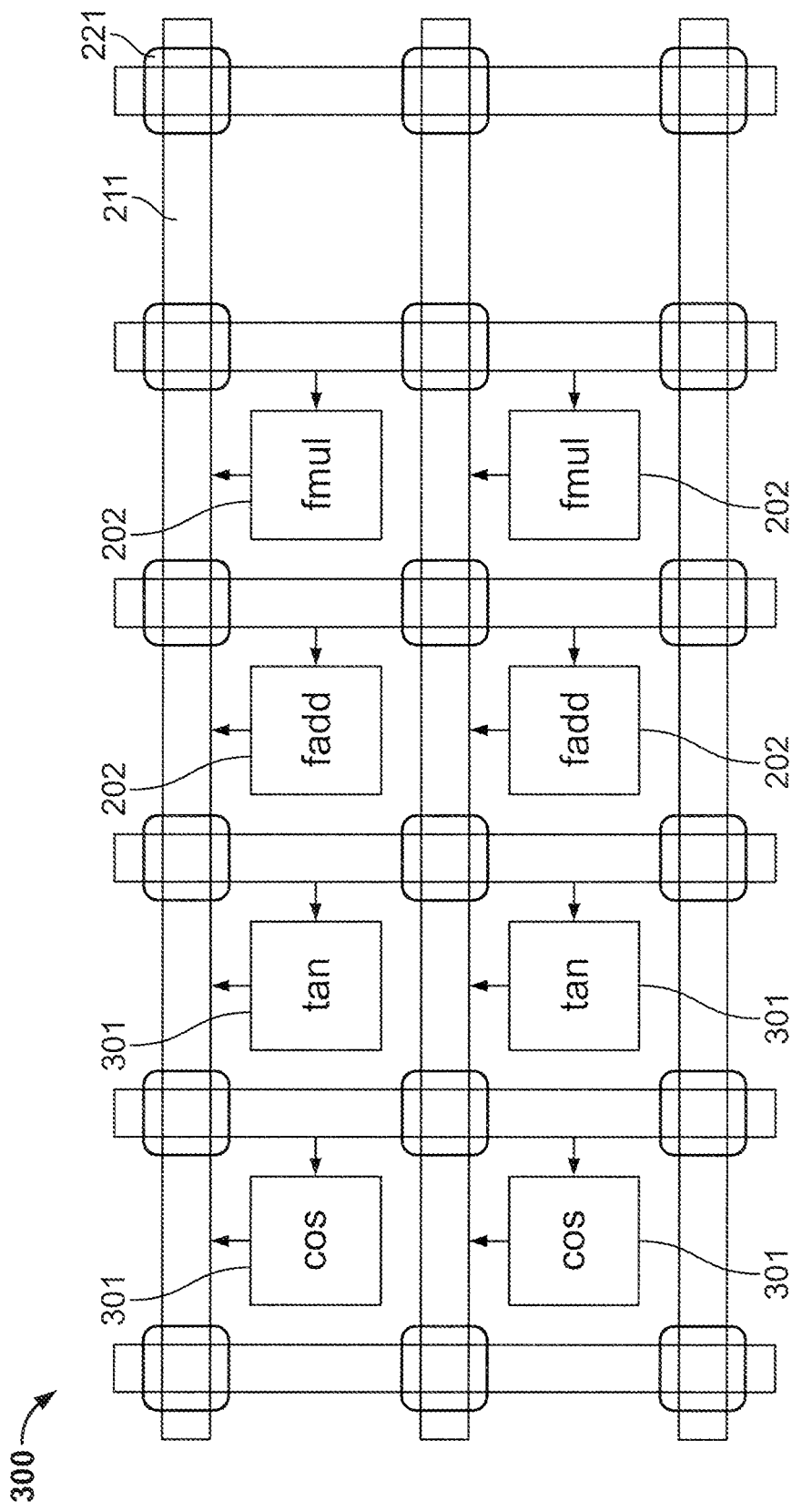
FIG. 3 shows an example of a basic virtual fabric in accordance with embodiments of the invention.
Figure 4:
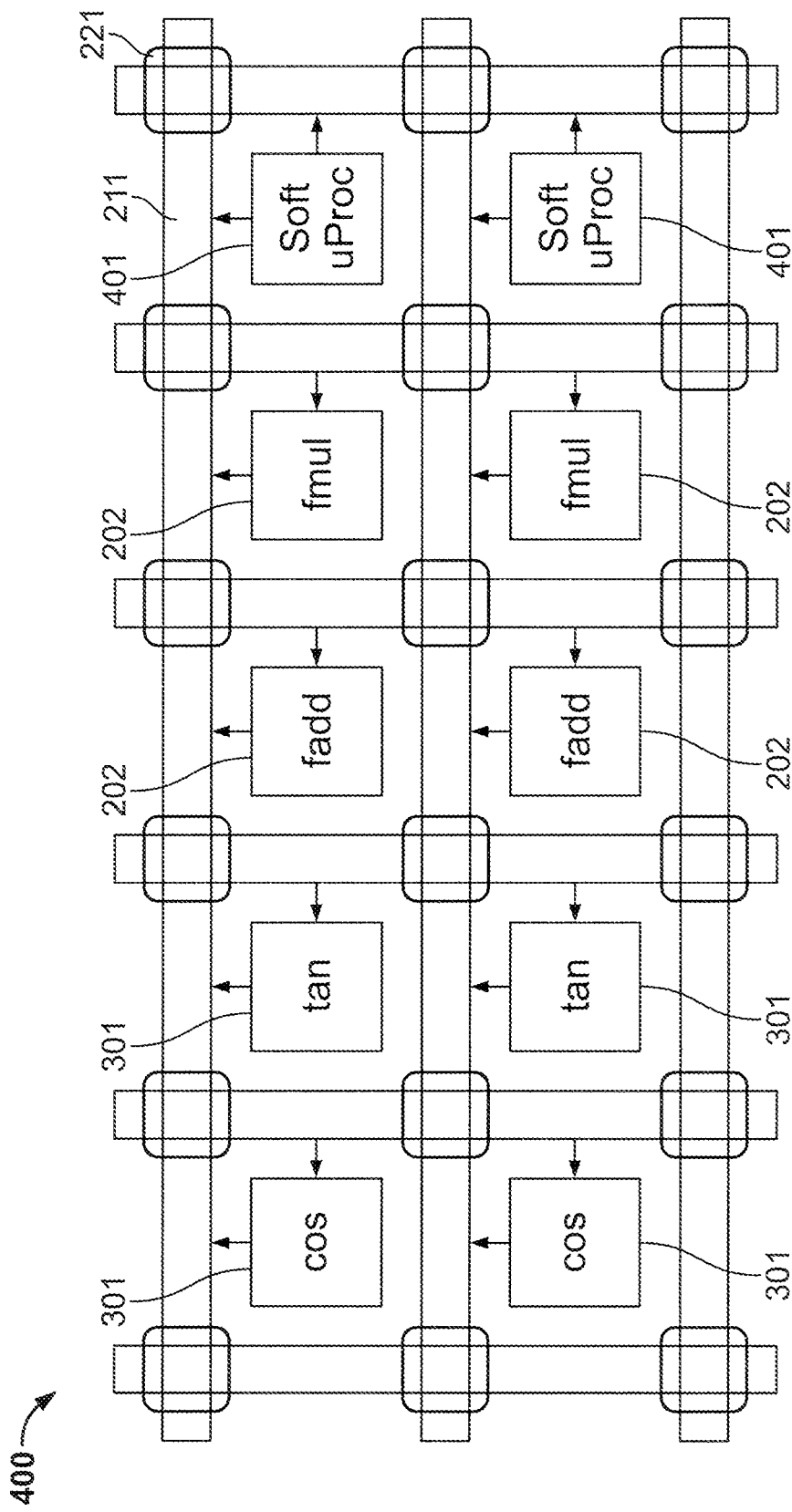
FIG. 4 shows an example of a more mathematically complex virtual fabric in accordance with embodiments of the invention.

The plurality of virtual fabrics may be considered a library of virtual fabrics. Different virtual fabrics in the library may have different distributions of different types of function blocks. For example, the library may include a plurality of different basic virtual fabrics, of which fabric 200 is just one example, each of which has a different distribution of function blocks 202 including basic mathematical functions along with multiplexing logic. There may also be some more complex virtual fabrics, of which fabric 300 (FIG. 3) is just one example, having the basic and multiplexing functions 202, but in which various function blocks 301 are for performing more complex functions such as trigonometric functions. As between different ones of those more complex virtual fabrics, the numbers and distributions of the various arithmetic, trigonometric and multiplexing functions may vary. There may even be virtual fabrics, of which fabric 400 (FIG. 4) is just one example, which may be similar to fabric 200 or fabric 300, except that one or more function blocks are replaced by soft processor blocks 401. Additional types of virtual fabrics also may be provided.

It may be desirable to speed up the performance of a virtual fabric by pipelining it to some degree. For example, register stages may be provided in the virtual routing switches, each of which may be thought of as a multiplexer followed by a register. Any element in the pipeline preferably has the ability to stall the pipeline—i.e., to stop the flow of data until it is ready to accept more—by sending a stall signal upstream. Otherwise, data might be lost if upstream elements continue to send data while a downstream element is too busy to be able to process it.

However, if an element sends a stall signal upstream, it might arrive one clock cycle too late, so that one clock cycle's worth of data might be lost. Therefore, the stall signal preferably is itself pipelined, thereby providing a pipelined stall signal network within the virtual fabric. This may be achieved by providing, in some or all routing switches, a register for the stall signal. Then, instead of sending out the stall signal from the stalled component, the stall signal may be sent from the register.

Figure 6:
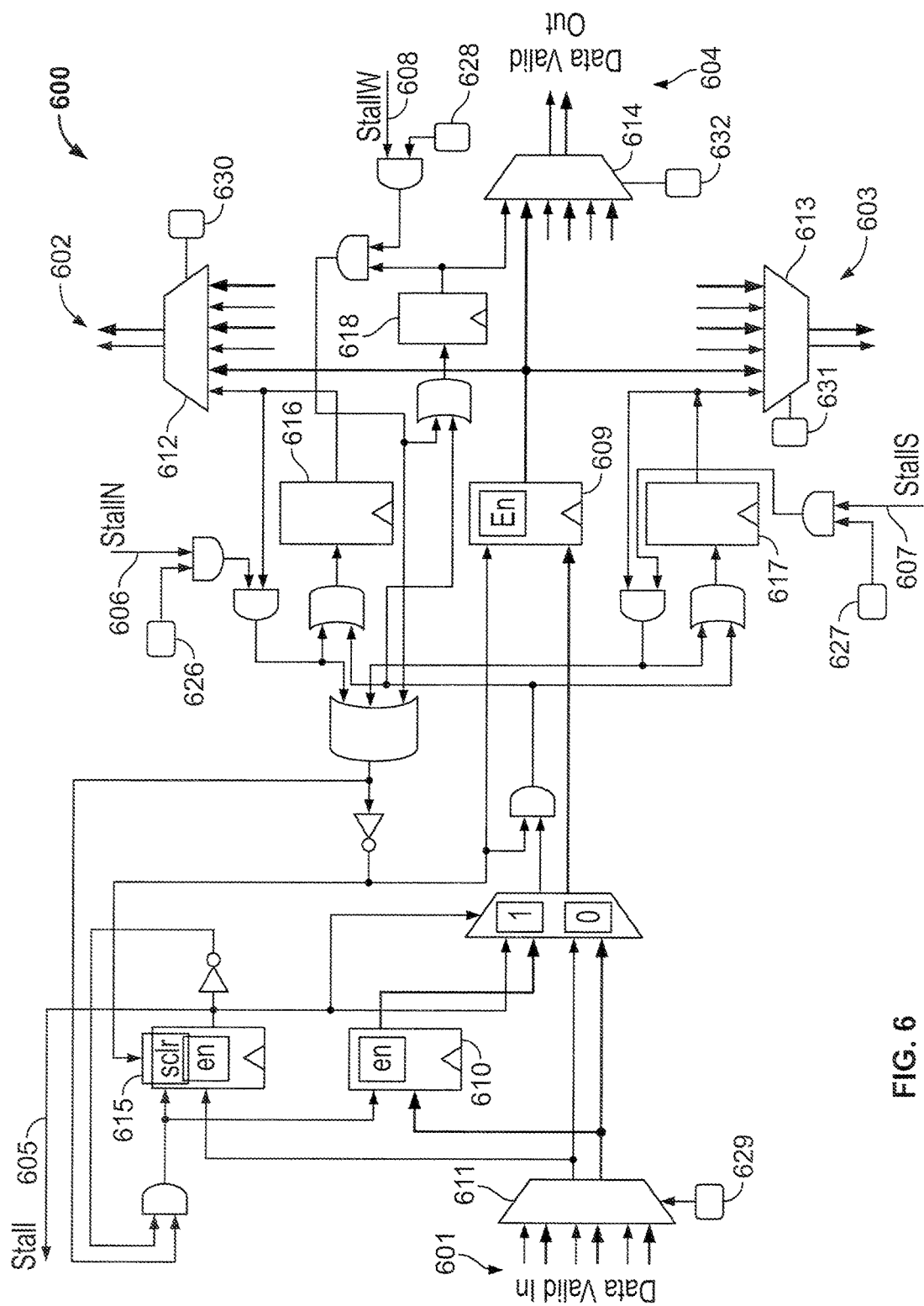
FIG. 6 shows an example of a virtual routing switch configured in a virtual fabric according to embodiments of the invention.

An example is shown in FIG. 6. All of the components of FIG. 6 are virtual—i.e., they are configured from the basic elements of the underlying FPGA or other configurable or programmable device as part of the compilation of the virtual fabric.

FIG. 6 is a diagram of one possible detailed implementation of a routing switch 600, in which a signal comes in at 601 from the "west" and is routable out to the "north" at 602, to the "south" at 603, or to the "east" at 604. Routing switch 600 needs to be able to send a stall signal back upstream at 605, while receiving stall signals from the north at 606, from the south at 607 and from the east at 608.

Virtual routing switch 600 includes an input multiplexer 611 and output multiplexers 612, 613, 614 on the north, south and east outputs, respectively. Such a routing switch might need to send a stall signal 605 back in the direction from which the input arrived, as well as receive stall signals 606, 607, 608 from any of the three output directions. In accordance with embodiments of the invention, a stall signal register 615 may be provided to output the stall signal 605, and stall signal registers 616, 617, 618 may be provided to register the received stall signals 606, 607, 608. Stall signal registers 615, 616, 617, 618 allow for fully; pipelined stall signal propagation both upstream and downstream.

Registers 609, 610 are provided for the input data. Register 609 captures the data that cannot be propagated further because of a stall being received from downstream. If any of the output directions 602, 603, 604 to which data are to be propagated is stalled, those data will be held in register 609 until the stall is cleared. Register 610 captures input data and prevents those data from being lost in case a stall signal 605 has to be asserted. In the absence of register 610, because of the aforementioned one-clock delay, new data would be received at multiplexer 611 on the first clock cycle after the assertion of stall signal 605 and would replace at multiplexer 611 any data previously received, even though the data previously received had not been propagated downstream. However, with the presence of register 610, the data previously received at multiplexer 611 are preserved, even though additional data have subsequently been received at multiplexer 611. Configuration registers 626, 627, 628 may be provided to turn on or off the ability to receive stall signals. Configuration register 629 selects the input to multiplexer 611, and therefore to virtual routing switch 600. Configuration registers 630, 631, 632 control output multiplexers 612, 613, 614 to select one or more outputs of virtual routing switch 600.

Figure 7:
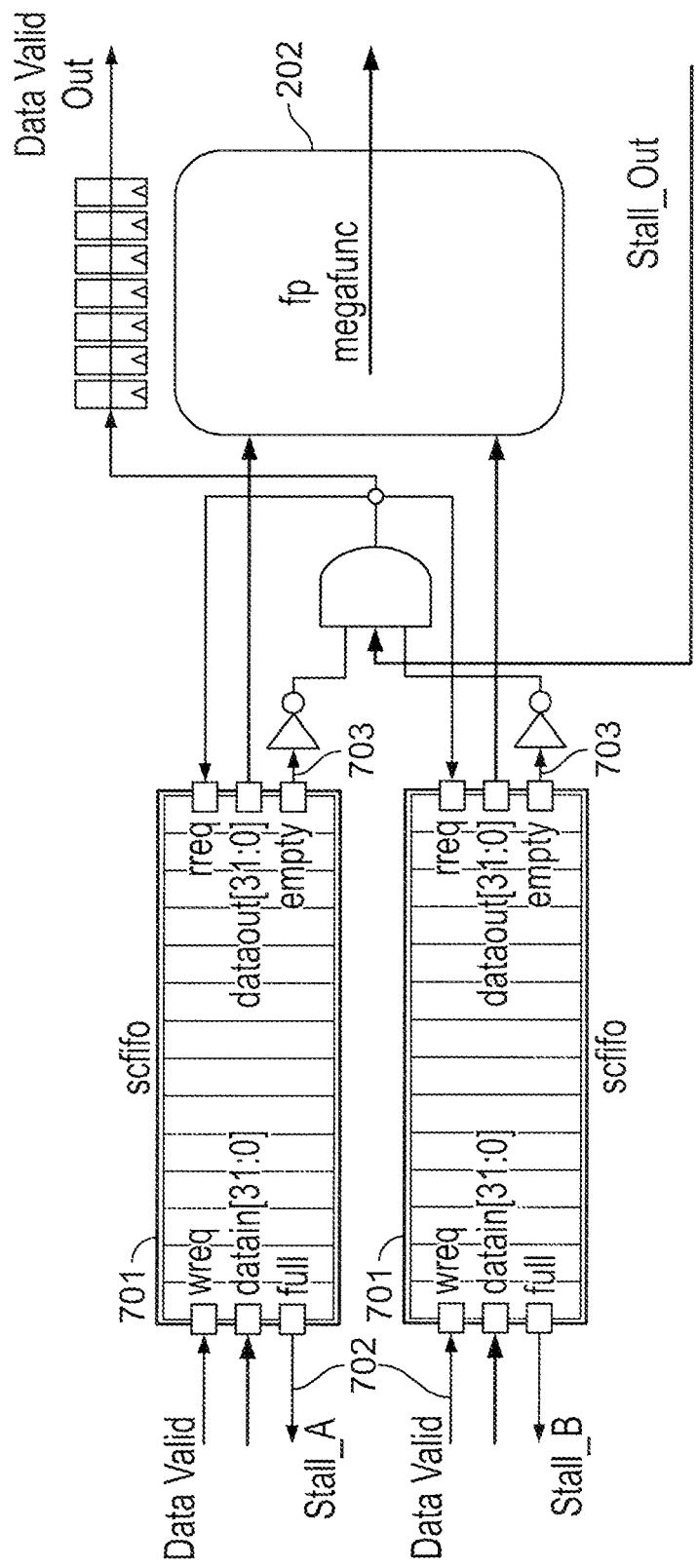
FIG. 7 shows an example of a function block with virtual FIFOs configured in a virtual fabric according; to embodiments of the invention.

In addition to the pipelining of the stall signal network as just described, the pipelining of the virtual fabric also may include registers for the data themselves on the inputs of individual function blocks 202, 301, 401 of the virtual fabric. Because the lengths of the datapaths to be pipelined are unknown at the time of creation of the virtual fabrics, and different datapaths to the same function block, as implemented in a particular user design, may differ, the data pipeline registers at the inputs of each function block 202, 301, 401 preferably are FIFOs 701 as shown in FIG. 7, to balance the pipelines.

The depth of each FIFO 701 may be selected based on the maximum expected pipeline imbalance. However, it is possible that a FIFO 701 may fill up, and therefore each FIFO 701 has the ability to assert a stall signal 702 when full.

Similarly, each FIFO 701 also may have the ability to assert an empty signal 703 to stall function block 202, 301, 401 so that function block 202, 301, 401 does not try read data when none are available. Otherwise, the various input pipelines to function block 202, 301, 401 may get out of sync—i.e., if function block 202, 301, 401 reads data from two or more pipelines when the data on one pipeline have not yet arrived.

According to another aspect of the invention, a programmable device may be configured by selecting from among a library or collection of previously compiled virtual fabrics. The selection of a particular virtual fabric may be carried out by programming software by examining the functional needs of the user's logic design and selecting the virtual fabric that most closely matches those functional needs in terms of numbers and types of virtual function blocks. That virtual fabric is executed on the device, either by an on-board hard processor, by a soft processor that is configured on board before, after or during selection of the virtual fabric, or by an external processor. Execution of the selected virtual fabric configures the device as a coarser-grained virtual device. Conventional synthesis, placement and routing tools could then be used to configure that coarser-grained virtual device with the user's logic design.

Figure 8:
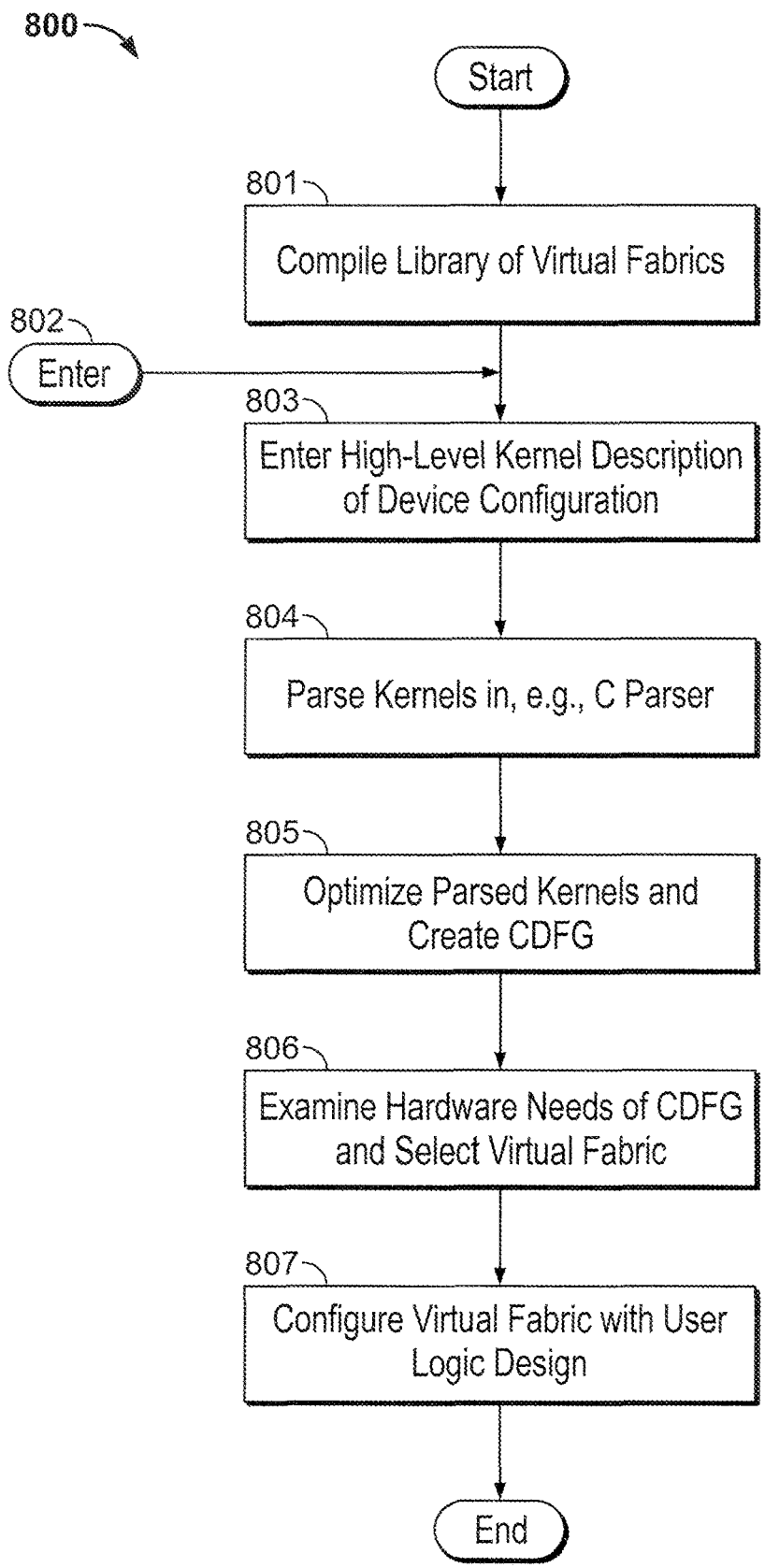
FIG. 8 shows a flow diagram of an embodiment of a method according to embodiments of the invention for using a library of virtual fabrics to configure a programmable device.

An embodiment of the process 800, diagrammed in FIG. 8 may begin, at step 801 with the creation of a collection of compiled virtual fabrics having different sizes, as well as different distributions of functions blocks of various types as described above. Step 801 could be performed by the device manufacturer and the library of virtual fabrics could be provided in a memory on the device or in a storage device or medium associated with device configuration software provided with the device. A third party also may provide the library of compiled virtual fabrics. Alternatively, the user may compile a library of virtual fabrics the first time the device is configured.

For a user who has compiled the user's own library of virtual fabrics, process 800 continues at step 803. For a user who is using a previously-compiled library of virtual fabrics (whether provided by the manufacturer or a third party, or by the user during a previous configuring of the device), the user enters process 800 at 802 and proceeds to step 803.

At step 803, the user enters a desired configuration in the form of high-level language statements, such as OpenCL statements, as described above, defining a set of kernels. As above, at step 804, the kernels are parsed using a high-level parser, such as a C-language parser, which produces an intermediate representation for each kernel. The intermediate representation may be in the form of instructions and dependencies between them. At step 805, this representation may then be optimized and converted into a hardware-oriented data structure, such as a Control-Data Flow Graph (CDFG).

At step 806, the CDFG is examined by the programming software to ascertain its hardware needs, and the software then selects a virtual fabric, from among the library of virtual fabrics, that meets those hardware needs. Using known techniques, the software may examine all virtual fabrics to find the best virtual fabric, or the examination may end once a virtual fabric is found that is sufficiently close to the hardware needs. In this context, "sufficiently close" means that all of the required resources are present in the virtual fabric, but the virtual fabric may have additional resources that may go unused.

Finally, at step 807, the user's logic design is programmed onto the selected virtual fabric from the CDFG using conventional synthesis, placement and routing techniques, such as those that may be implemented by the aforementioned QUARTUS® II software available from Altera Corporation. Unless the device includes an embedded hard processor, or an external hard processor is to be used to execute the virtual fabric, this step may include configuring a soft processor to execute the virtual fabric.

A particular user logic design may include a large number of functions not all of which are active at the same time. Because virtual fabrics as described herein are relatively coarse, they have a relatively small number of configuration bits. Therefore, it may not be impractical in terms of execution time) to allow reconfiguration of the virtual fabric at run-time. Thus, the virtual fabric may be configured with a first configuration including a first group of functions, and then, "on the fly," may be reconfigured with a second group of functions (which may overlap the first group of functions—i.e., it may have some functions in common with the first group of functions).

Figure 9:
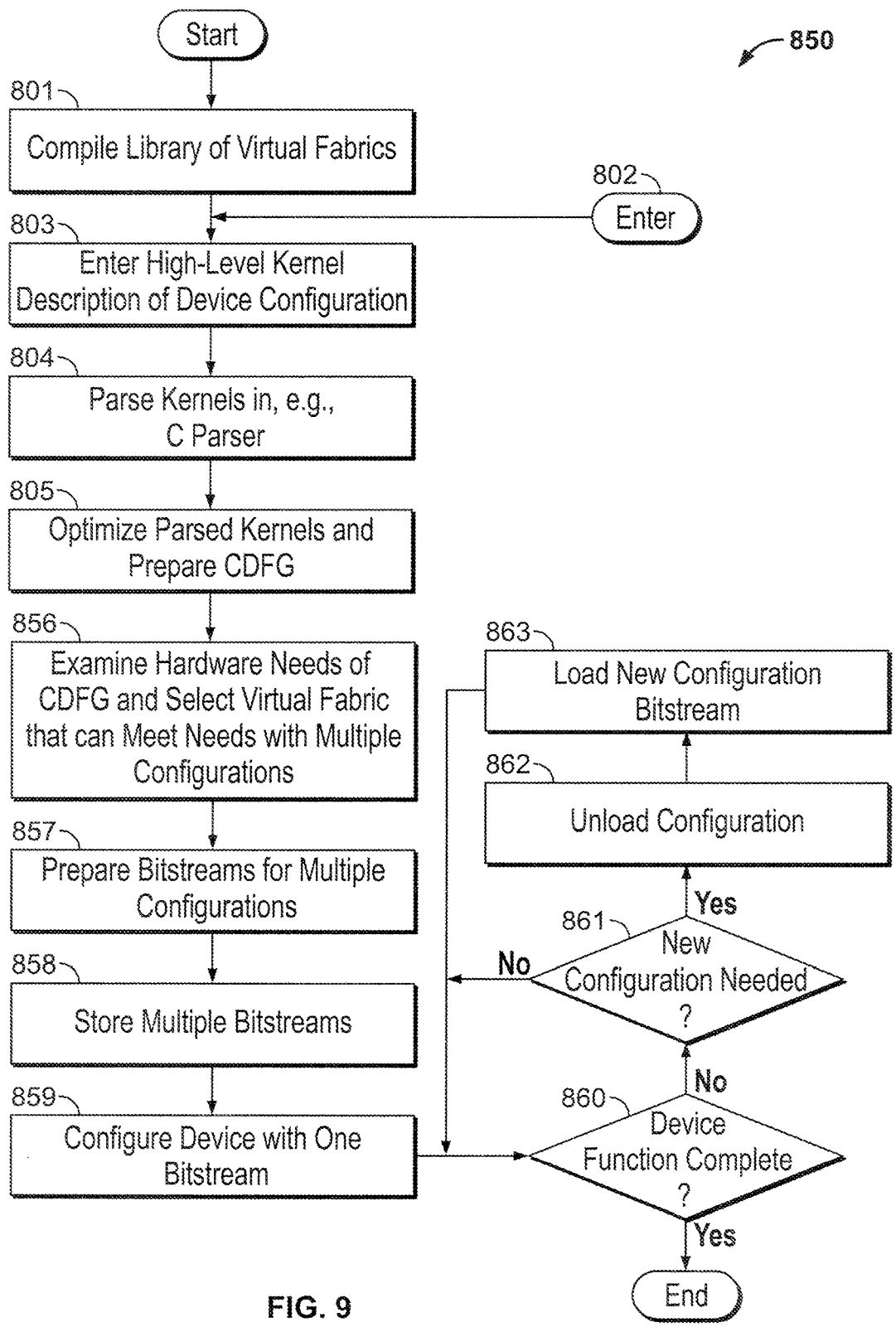
FIG. 9 shows a flow diagram of an embodiment of another method according to embodiments of the invention for using a library of virtual fabrics to configure a programmable device.

A method 850 for programming a device to use such reconfiguration is shown in FIG. 9. Method 850 starts out similarly to method 800, with steps 801, 802, 803, 804 and 805. At step 856, the CDFG is examined to ascertain its hardware needs, and the software then selects a virtual fabric, from among the library of virtual fabrics, that can meet those hardware needs in two or more separate configurations. For example, one way of deciding which virtual fabric to use would be to use a cost function that computes how closely the virtual fabric resembles the resource needs of the kernel.

At step 857, the two or more separate configurations are programmed using conventional synthesis, placement and routing techniques, such as those that may be implemented by the aforementioned QUARTUS® II software. The configuration bitstreams for the various configurations are stored at step 858, and the virtual fabric is configured at step 859 with the first configuration. As necessary (tests 860, 861), that configuration may be unloaded at step 862 and another one of the two or more configurations may be loaded at step 863. The method returns to step 859 as the new configuration is executed. This may happen more than once as various ones of the two or more configurations are unloaded and reloaded until the desired function of the device has been accomplished.

It will be appreciated that because the selected virtual fabric is not being changed during the reconfiguration process just described, the reconfiguration process can be used regardless of whether the physical device supports reconfiguration on-the-fly. It is only necessary that the virtual device represented by the virtual fabric support reconfiguration on-the-fly. It will be further appreciated that if the physical device supports reconfiguration on-the-fly, then not only can the configuration of a selected virtual fabric be changed at run time, but the virtual fabrics themselves can be unloaded and loaded on-the-fly (with configurations of any particular virtual fabric that is loaded being changed on-the-fly, if needed, as described above).

Because the virtual fabrics in the library are compiled ahead of time into hardware description language representations, only the user's high-level synthesis language representation of the desired configuration of the virtual fabric need be compiled as part of the user programming process. The user still enters the complete high-level description of the desired circuit, and there still will be a processor present to execute that high-level description to create a configured device. But because a large part of the execution of the user's high-level description will involve selection of a pre-compiled virtual fabric, the only compilation involved will be the compilation of the configuration of the virtual fabric, which, as noted above, involves only a relatively small configuration problem. Therefore, the compilation time seen by the user is much shorter than what would be required if the entire design were to be compiled from the high-level description, and is comparable to configuration times when using hardware description languages.

Thus it is seen that a method for configuring a programmable device using a high-level synthesis language, without requiring inordinately long compilation times, has been provided.

Instructions for carrying out a method according to this invention for programming a programmable device may be encoded on a machine-readable medium, to be executed by a suitable computer or similar device to implement the method of the invention for programming or configuring PLDs or other programmable devices with a configuration described by a high-level synthesis language as described above. For example, a personal computer may be equipped with an interface to which a PLD can be connected, and the personal computer can be used by a user to program the PLD using suitable software tools as described above. Moreover, the same machine-readable medium, or a separate machine-readable medium, may be encoded with the library of virtual fabrics.

FIG. 10 presents a cross section of a magnetic data storage medium 1200 which can be encoded with a machine executable program that can be carried out by systems such as the aforementioned personal computer, or other computer or similar device, or encoded with a library of virtual fabrics. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 11 shows a cross section of an optically-readable data storage medium 1210 which also can be encoded with such a machine-executable program, which can be carried out by systems such as the aforementioned personal computer, or other computer or similar device, or encoded with a library of virtual fabrics. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

Figure 12:
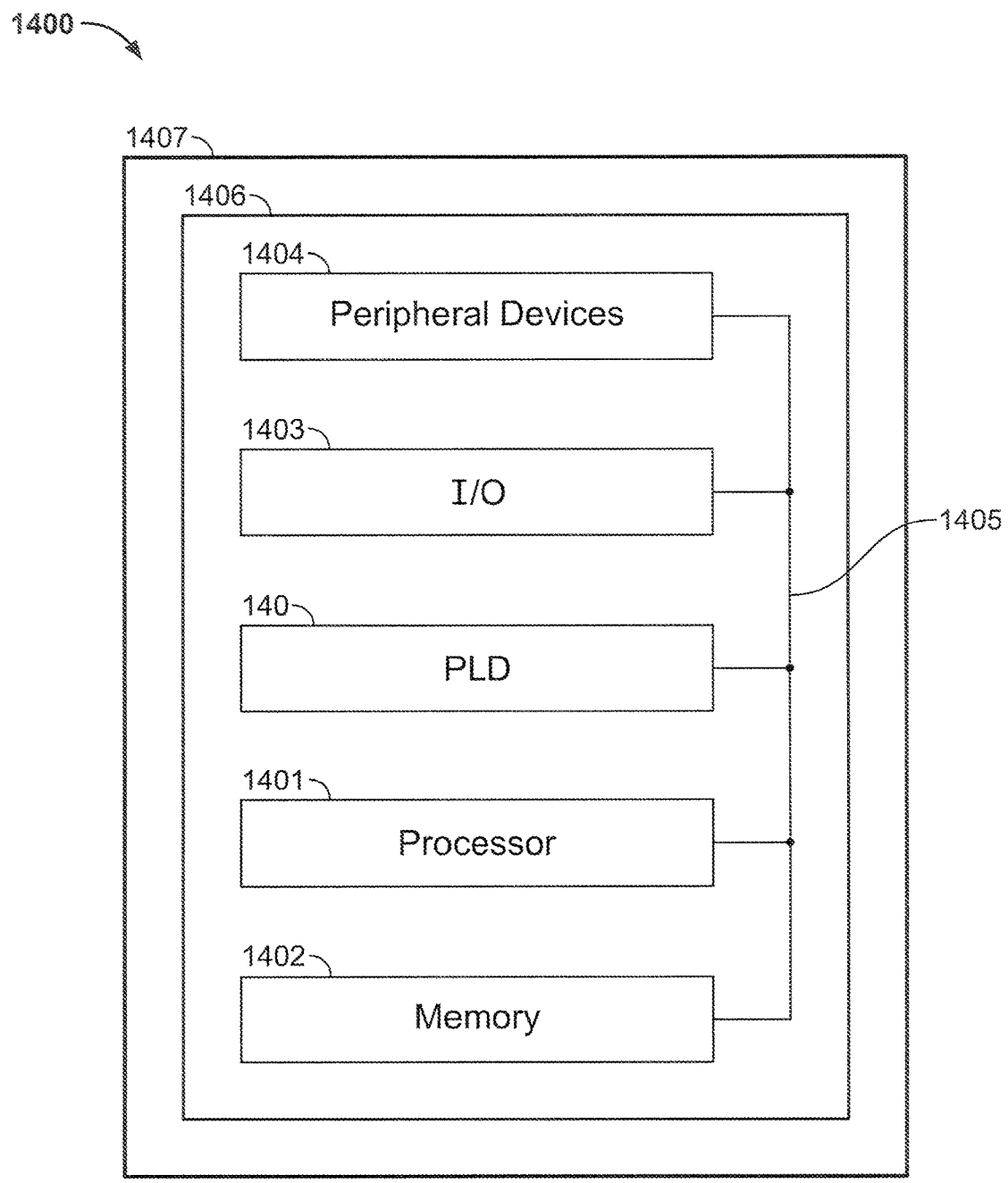
FIG. 12 is a simplified block diagram of an illustrative system employing a programmable logic device incorporating the present invention.

A PLD 1500 programmed according to the present invention may be used in many kinds of electronic devices. One possible use is in a data processing system 1400 shown in FIG. 12. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, or any other application, where the advantage of using programmable or reprogrammable logic is desirable. PLD 140 can be used to perform a variety of different logic functions. For example, PLD 1500 can be configured as a processor or controller that works in cooperation with processor 1401. PLD 1500 may also be used as an arbiter for arbitrating access to a shared resources in system 1400. In yet another example, PLD 1500 can be configured as an interface between processor 1401 and one of the other components in system 1400. It should be noted that system 1400 is only exemplary, and that the true scope and spirit of the invention should be indicated by the following claims.

Various technologies can be used to implement PLDs 1500 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method for configuring a programmable integrated circuit device, comprising:
   compiling a plurality of virtual programmable devices from descriptions in a high-level language;
   storing the compiled plurality of virtual programmable devices;
   selecting and instantiating one of the compiled plurality of virtual programmable devices in response to a user configuration that includes a first configuration having a first group of functions and a second configuration having a second group of functions different from the first group of functions;
   configuring the instantiated one of the compiled virtual programmable devices with the first configuration without the second configuration to implement the first group of functions;
   unloading the first configuration and configuring the instantiated one of the compiled virtual programmable device with the second configuration to implement the second group of functions in response to a result from testing the first configuration on the virtual programmable device; and
   configuring the programmable integrated circuit device to transform programmable resources on the programmable integrated circuit device to implement the instantiated one of the compiled virtual programmable device with the second configuration.

2. The method of claim 1, wherein compiling the plurality of virtual programmable devices comprises compiling configurations of routing resources from programmable resources of the programmable integrated circuit device.

3. The method of claim 2, wherein compiling the configurations of the routing resources comprises compiling a stall signal network.

4. The method of claim 3, wherein compiling the stall signal network comprises compiling a network including a plurality of routing switches, each of the routing switches having:
   an input and at least one output;
   a respective register for a stall signal on each of the input and the at least one output;
   an output data stall register for storing output data during a stall of any of said at least one output;
   a first input data stall register for storing data received at the input prior to a stall of the input; and
   a second input data stall register for storing data present at the input when said input stalls.

5. The method of claim 1, wherein compiling the plurality of virtual programmable devices comprises compiling configurations of a plurality of function blocks from programmable resources of the programmable integrated circuit device.

6. The method of claim 5, wherein the plurality of function blocks comprises at least one of an arithmetic function block, a trigonometric function block, a multiplexing logic block, or a soft processor block.

7. The method of claim 5 further comprising configuring input registers for at least one function block of the plurality of function blocks.

8. The method of claim 7, wherein configuring the input registers comprises configuring a respective FIFO on at least one input of the at least one function block of the plurality of function blocks.

9. The method of claim 7, wherein configuring the respective FIFO comprises configuring a respective FIFO having a respective depth equal to a respective maximum expected pipeline imbalance.

10. The method of claim 1, wherein the high-level language is OpenCL.

11. The method of claim 1, wherein compiling the plurality of virtual programmable devices comprises compiling at least one virtual programmable device that is reconfigurable during operation.

12. The method of claim 1, wherein the testing determines whether a desired function has been accomplished.

13. A non-transitory computer readable medium including a sequence of instructions stored thereon for causing a computer to execute a method for configuring a programmable integrated circuit device, comprising:
   compiling a plurality of virtual programmable devices from descriptions in a high-level language;
   storing the compiled plurality of virtual programmable devices;
   selecting and instantiating one of the compiled plurality of virtual programmable devices in response to a user configuration that includes a first configuration having a first group of functions and a second configuration having a second group of functions different from the first group of functions;
   configuring the instantiated one of the compiled virtual programmable devices with the first configuration without the second configuration implement the first group of functions;
   uploading the first configuration and configuring the instantiated one of the compiled virtual programmable device with the second configuration to implement the second group of functions in response to a result from testing the first configuration on the virtual programmable device; and
   configuring the programmable integrated circuit device to transform programmable resources on the programmable integrated circuit device to implement the instantiated one of the compiled virtual programmable device with the second configuration.

14. The non-transitory computer readable medium of claim 13, wherein compiling the plurality of virtual programmable devices comprises compiling configurations of routing resources and configurations of a plurality of function blocks.

15. The non-transitory computer readable medium of claim 14, wherein compiling the configurations of the routing resources comprises compiling a stall signal network.

16. The non-transitory computer readable medium of claim 14, wherein the plurality of function blocks comprises at least one of an arithmetic function block, a trigonometric function block, a multiplexing logic block, or a soft processor block.

17. The non-transitory computer readable medium of claim 13, wherein compiling the plurality of virtual programmable devices comprises compiling at least one virtual programmable device that is reconfigurable during operation.

18. A method for configuring a programmable integrated circuit device, comprising:
    compiling a plurality of virtual programmable devices from descriptions in a high-level language;
    receiving a user configuration that includes a first configuration having a first group of functions and a second configuration having a second group of functions different from the first group of functions;
    selecting one of the compiled plurality of virtual programmable devices in response to determining that the one of the compiled plurality of virtual programmable devices supports both the first configuration and the second configuration;
    instantiating the one of the compiled plurality of virtual programmable devices
    configuring the instantiated one of the compiled virtual programmable devices with the first configuration without the second configuration to implement the first group of functions; and
    configuring the programmable integrated circuit device to transform programmable resources on the programmable integrated circuit device to implement the instantiated one of the compiled virtual programmable device with one of the first configuration and the second configuration.

19. The method of claim 18 further comprising unloading the first configuration and configuring the instantiated one of the compiled virtual programmable device with the second configuration to implement the second group of functions in response to a result from testing the first configuration on the virtual programmable device.

* * * * *